No. 706,836. Patented Aug. 12, 1902.
W. R. LEE.
SCOOP AND SCRAPER.
(Application filed Dec. 4, 1901.)
(No Model.)
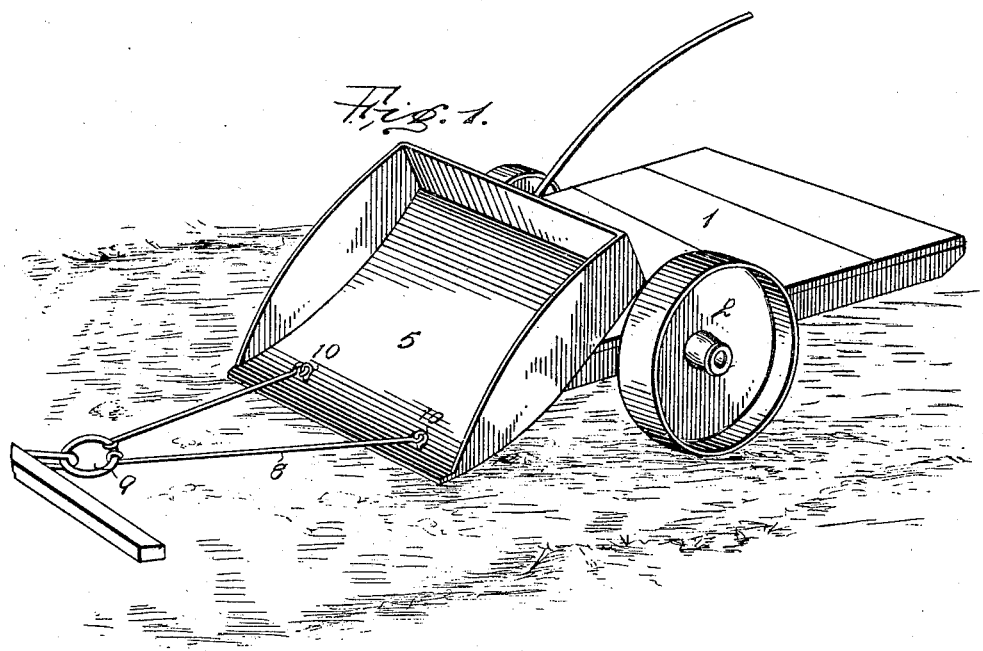
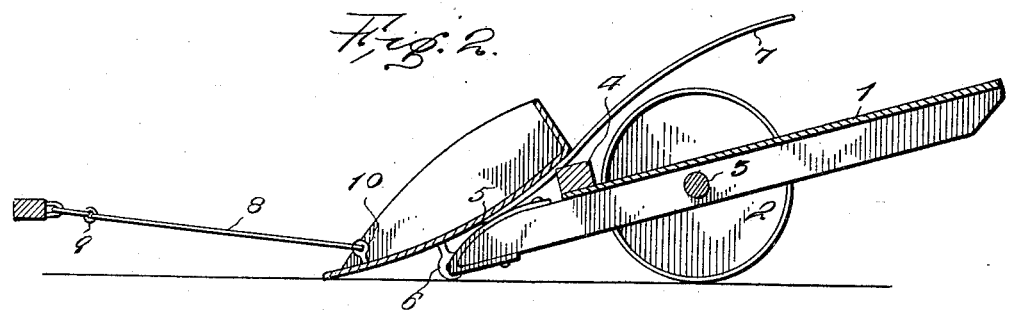
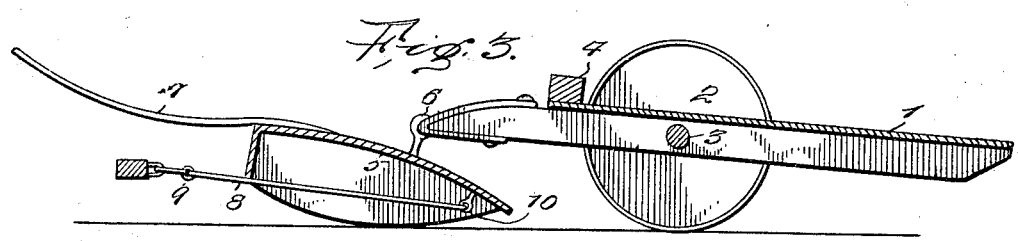
Witnesses
O. M. Simpson
J. W. Garner
William R. Lee Inventor
by C. A. Snow & Co.
Attorneys

UNITED STATES PATENT OFFICE.

WILLIAM R. LEE, OF ST. CLAIR, NEVADA.

SCOOP AND SCRAPER.

SPECIFICATION forming part of Letters Patent No. 706,836, dated August 12, 1902.

Application filed December 4, 1901. Serial No. 84,673. (No model.)

*To all whom it may concern:*

Be it known that I, WILLIAM R. LEE, a citizen of the United States, residing at St. Clair, in the county of Churchill and State of Nevada, have invented a new and useful Scoop and Scraper, of which the following is a specification.

My invention is an improved scraper and scoop for leveling roads, ditching, and other purposes; and it consists in the peculiar construction and combination of devices hereinafter fully set forth and claimed.

In the accompanying drawings, Figure 1 is a perspective view of a scraper and scoop constructed in accordance with my invention. Fig. 2 is a vertical longitudinal sectional view of the same, showing the scoop in operative position for scraping earth. Fig. 3 is a similar view showing the scoop overturned to discharge the same of its contents.

In the embodiment of my invention I provide a platform 1, which may be of any suitable construction and which is mounted on a pair of supporting-wheels 2. The axle 3, on which the wheels are journaled, is disposed about midway between the ends of the platform. A bolster-bar 4 is here shown disposed transversely on the platform at a suitable distance from the front end thereof.

The scoop and scraper 5 is preferably of the form here shown, and the front end of the platform is flexibly connected to the rear side of said scoop and scraper, as by the hinges 6. Within the scope of my invention any suitable pivotal means may be employed for connecting the scoop and scraper to the front end of the platform. A lever 7 is attached to and extends rearwardly from the scoop and scraper. The platform, together with the wheels, constitutes a drag element, and owing to the disposition of the axles of the wheels intermediate the front and rear ends of the platform the front end of the platform, to which the scoop is connected, is vertically movable by rocking the platform on the axles of the wheels.

In the form of my invention here shown the draft element comprises a pair of draft-rods 8 and a link 9, to which the front ends of the draft-rods are attached. The rear ends of the draft-rods are flexibly connected to the scoop and scraper, as at 10, at points in advance of the flexible connections 6 between the said scoop and scraper and the front end of the platform.

In the operation of my invention the driver stands upon the platform 1, and when the scoop and scraper is in the position shown in Figs. 1 and 2 of the drawings the driver may dispose his weight in advance of the axle, if it be necessary or desirable so to do, to facilitate the action of the scoop and scraper in scraping up earth. When the scoop and scraper has become filled, if the same is to be moved some distance before discharging its contents, the driver may by standing on the rear portion of the platform somewhat counterbalance the loaded scoop and scraper and to that extent lessen the draft on the team by reducing friction between the front edge of the scoop and scraper and the earth. In order to discharge the scoop and scraper of its contents, the lever 7 is operated to turn the scoop and scraper on its pivots 6 and overturn the same to the position shown in Fig. 3. Owing to the relation or disposition of the connections 10 between the draft element and the scoop and scraper with respect to the connections 6 between the scoop and scraper and the front end of the platform such leverage is exerted on the scoop and scraper by the draft of the team as to return the scoop and scraper after its contents have been discharged to its initial operative position, (shown in Fig. 2,) hence relieving the driver of this labor.

Having thus described my invention, I claim—

1. A drag element having a vertically-movable member, in combination with a scoop, pivotally connected, at a point in advance of the center thereof, to said vertically-movable member of the drag element, a lever to overturn the scoop, and a draft element connected to the scoop, at a point in advance of the center thereof, whereby the stress of the draft, coacting with the lag of the drag element, will return the scoop to operative position after the scoop has been overturned, substantially as described.

2. A drag element having a pivotally-supported platform the front end of which is movable in a vertical plane, in combination with a scoop pivotally connected at a point in advance of the center thereof to the front end of the platform, and a draft element connected to the scoop at a point in advance of the center thereof, substantially as described.

3. The combination of a platform having supporting-wheels, the axle of which is intermediate the ends of said platform, a scoop pivotally connected to the front end of the platform and thereby adapted to be overturned and a draft element connected to the scoop at a point in advance of the pivotal connection between said scoop and platform, substantially as described.

4. The combination of a drag element adapted to rock in a vertical plane, a scoop pivotally connected to said drag element and adapted to be overturned, a lever attached to and extending rearwardly from the scoop and a draft element connected to the scoop at a point in advance of the pivotal connection between the latter and the drag element, substantially as described.

In testimony that I claim the foregoing as my own I have hereto affixed my signature in the presence of two witnesses.

WILLIAM R. LEE.

Witnesses:
  JOHN P. SCHNEIDER,
  W. J. MILLS.